(No Model.)
J. FARRELL.
COOKING UTENSIL.
No. 343,234. Patented June 8, 1886.
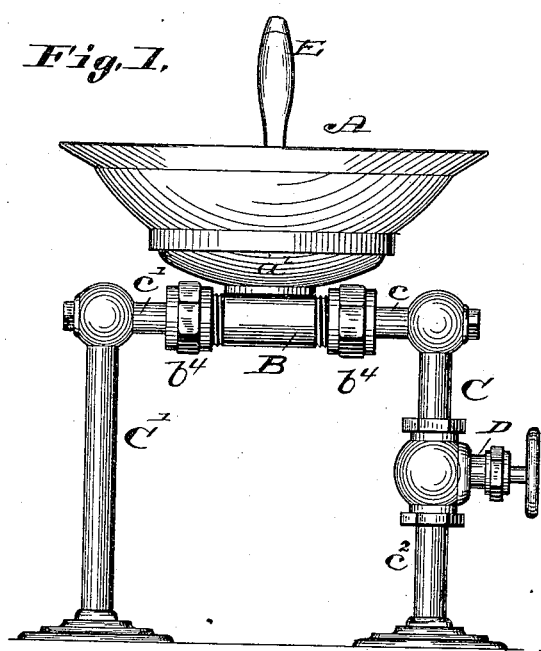
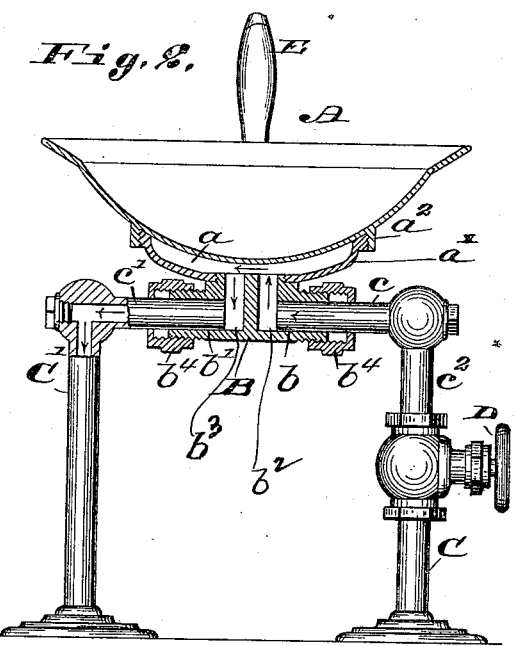
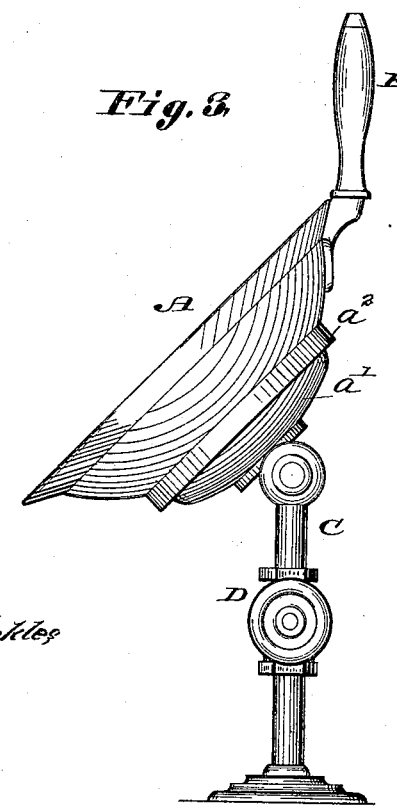
Attest:
Charles Pickles
J. W. Hoke.
Inventor:
John Farrell
by C. D. Moody
atty
N. PETERS, Photo-Lithographer, Washington, D. C.

UNITED STATES PATENT OFFICE.

JOHN FARRELL, OF ST. LOUIS, MISSOURI.

COOKING UTENSIL.

SPECIFICATION forming part of Letters Patent No. 343,234, dated June 8, 1886.

Application filed July 27, 1885. Serial No. 172,790. (No model.)

*To all whom it may concern:*

Be it known that I, JOHN FARRELL, of St. Louis, Missouri, have made a new and useful Improvement in Cooking Utensils, of which the following is a full, clear, and exact description.

In a pending application for Letters Patent, filed August 27, 1884, I have described an improvement in cooking utensils, consisting of a steam-pan whose steam-pipes are so constructed as will admit of the pan being tilted to and from an upright position, in order that the contents of the pan, after being cooked, can, by tilting the pan into an inclined position, be poured from the pan.

The present improvement relates to the same class of cooking utensils, being a modification of the construction referred to.

It consists in the special mode of constructing and connecting the pipes used to conduct the steam to and from and to support the pan.

The annexed drawings, making part of this specification, illustrate the improvement. Figure 1 is a side elevation of the improvement. Fig. 2 is a vertical longitudinal section, partly in side elevation; and Fig. 3 is an elevation at right angles to that of Fig. 1, the pan being tilted.

The same letters of reference denote the same parts.

A represents the pan. Its bottom is made hollow, or is jacketed to form the space $a$, to receive the steam used in heating the pan. This part of the construction is conveniently formed by screwing the plate $a'$ into the flange $a^2$ upon the under side of the pan.

B represents a plug, which is screwed into the plate $a'$. The plug is perforated longitudinally at its ends to receive the horizontal arms $c\ c'$ of the tubular standard C C'. The longitudinal perforations $b\ b'$ in the plug B connect, respectively, with the transverse perforations $b^2\ b^3$, which in turn communicate with the steam-space $a$ in the pan. The steam is supplied through the standard C, the steam passing through the arm $c$ into the plug B, thence through the perforation $b^2$ into the space $a$, and thence is exhausted through the perforation $b^3$, the arm $c'$, and standard C', as indicated by the arrows in Fig. 2. The arms $c\ c'$ also serve as journals for the plug B, carrying the pan, to be tilted upon, and, as indicated by the two positions of the pan shown, respectively, in Figs. 1 and 3.

The valve D, for controlling the passage of the steam, is arranged in the upright portion $c^2$ of the standard C.

The pan is provided with a handle, E, by means of which the pan can be tilted.

The joints between the plug B and the arms $c\ c'$ are made steam-tight by means of suitable stuffing-boxes, $b^4$.

I claim—

1. The combination of the tilting steam-vessel A, the plug B, having perforations at $b\ b'\ b^2\ b^3$, and the tubular standards C C', substantially as described.

2. The combination of the tilting steam-vessel A, the plug B, having perforations $b\ b'\ b^2\ b^3$, the tubular standards C C', and the valve D, substantially as described.

JOHN FARRELL.

Witnesses:
C. D. MOODY,
FREDERICK SHICKLE.